Nov. 27, 1945.    B. F. PARR    2,389,927
TOASTER APPARATUS
Filed July 23, 1943
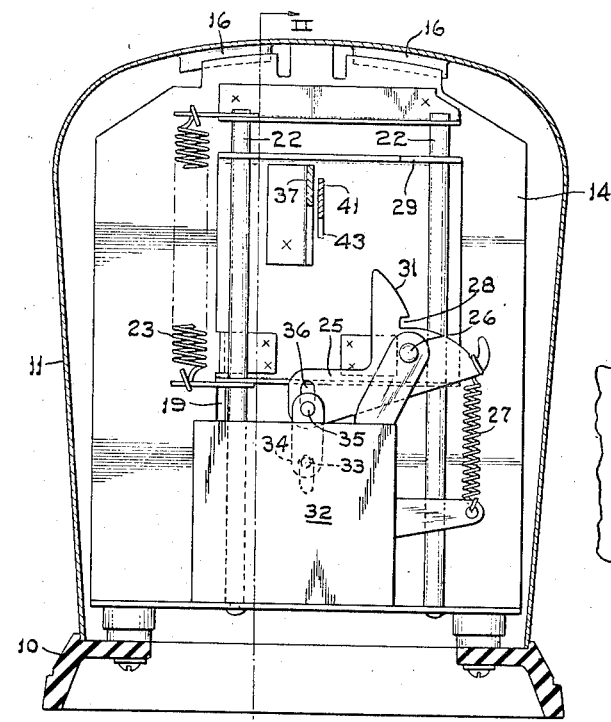
FIG. 1.
FIG. 4.
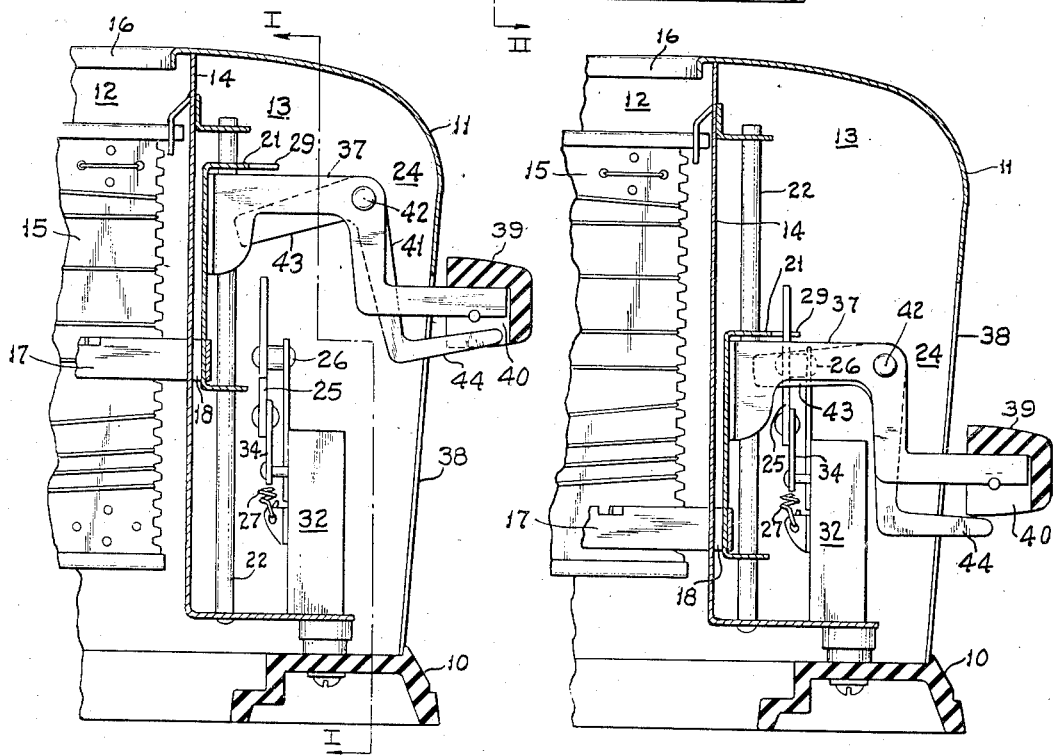
WITNESSES:    FIG. 2.    FIG. 3.    INVENTOR
                                    BERNARD F. PARR.
                                    BY
                                    ATTORNEY Patented Nov. 27, 1945

2,389,927

UNITED STATES PATENT OFFICE 2,389,927

TOASTER APPARATUS

Bernard F. Parr, Mansfield, Ohio, assignor to Westinghouse Electric Corporation, East Pittsburgh, Pa., a corporation of Pennsylvania Application July 23, 1943, Serial No. 495,815

3 Claims. (Cl. 99—391)

My invention relates to apparatus for toasting bread or the like and has for an object to provide improved apparatus of this kind.

A further object of the invention is to provide an improved manually-operated handle structure which may be readily actuated to elevate or depress the bread carriage of a toaster and which is positive in operation and inexpensive to construct.

These and other objects are effected by my invention as will be apparent from the following description and claims taken in accordance with the accompanying drawing, forming a part of this application, in which:

Fig. 1 is a transverse sectional view through an oven type toaster constructed in accordance with my invention, which view is taken along the line I—I of Fig. 2;

Fig. 2 is a sectional view taken along the line II—II of Fig. 1;

Fig. 3 is a view similar to Fig. 2, but with the bread carriage latched in its lower or toasting position; and Fig. 4 is a front view of the handle mechanism for raising and lowering the bread carriage of the toaster.

Reference will now be had to the drawing wherein I have elected to show my invention applied to an oven type toaster including a base 10 and a casing 11 secured thereto and enclosing an oven 12 and a compartment 13. An end plate 14 secured to the base 10 separates the oven 12 and the compartment 13. A plurality of heating elements, one of which is shown at 15, are arranged within the oven 12, which heating elements are constructed and arranged in any suitable manner well known in the art. The casing 11 is provided with a pair of openings 16 communicating with the oven 12 and through which the bread to be toasted is passed. The bread slices are supported within the oven 12 upon bread supports 17 forming a part of a carriage structure, generally shown at 18. The bread supports 17 extend through vertically-extending slots in the wall 14, one of which is shown at 19 in Fig. 1, and are secured to a member 21 slidably mounted on a pair of vertical rods 22, the latter being supported by the end plate 14. The carriage structure 18 is biased to its upper or bread-receiving position by means of a tension spring 23 fixed at its upper end and connected to the slidable member 21 at its lower end. When the toaster is to be operated, the carriage structure 18 is moved to its lower or bread-toasting position, as shown in Fig. 3, by means of a handle structure generally indicated at 24 and described in detail hereinafter.

The bread carriage 18 is retained in its lower position during a toasting operation by means of a latching mechanism of any well-understood construction and which may include a latch 25 carried by a pivot 26 and biased clockwise about the pivot 26 at all times by means of a tension spring 27 (see Fig. 1). The latch 25 is provided with a notch 28 which, when the carriage 18 is moved to its lower position, receives a projection 29, carried by the slidable member 21. During downward movement of the carriage 18, the projection 29 engages a cam portion 31 formed on the latch 25 and moves the latch 25 slightly counterclockwise about its pivot 26 until the projection 29 is opposite the notch 28, whereupon the spring 27 moves the latch 25 to the position shown in Fig. 1. In this position, the projection 29 is disposed within the notch 28 so that the carriage 18 is retained in its lower or toasting position.

At the conclusion of the toasting operation, a timing mechanism, generally shown at 32 and of any well-understood construction, moves the latch 25 counterclockwise about the pivot 26 and releases the projection 29, whereupon the spring 23 actuates the carriage 18 to its upper or bread-receiving position, shown in Fig. 2. It will be understood that the timing mechanism 32 includes a movable arm 33 connected by a link 34 to the latch 25. The link 34 may include a pin 35 which is disposed within a slot 36 formed in the latch 25 to provide a lost-motion connection for a purpose to be described hereinafter. It will be understood that the latching mechanism which I have shown is disclosed by way of example and that my invention may be employed with various other forms of timer-operated latching mechanisms.

In accordance with my invention, the handle structure generally shown at 24 includes an arm 37 fixed to the slidable member 21 and having the outer end thereof extending through a vertical slot 38 formed in the casing 11 (see Fig. 4). The outer end of the arm 37 carries a grip or handle 39 having a recess 40 formed in the lower portion thereof.

In order that the operator may release the carriage 18 independently of the timing mechanism 32, the handle structure 24 is provided with a tripping lever 41 pivoted at 42 to the arm 37 and including a tripping leg 43 and a trigger portion 44. In the upper position of the bread carriage 18, the weight of the tripping leg 43 maintains the trigger 44 upwardly within the recess 40. In the lower position of the bread carriage 18, the tripping leg 43 rests upon the latch 25, as shown in Fig. 3, and, in this position, the trigger 44 is swung downwardly out of the recess 40. Accordingly, if the operator desires to release the bread carriage 18 independently of the timing mechanism 32 at any time, the trigger 44 may be moved upwardly by the finger of the operator in order to lower the tripping leg 43. Downward movement of the leg 43 swings the bar 25 counterclockwise sufficiently to release the projection 29, whereupon the bread carriage 18 is moved upwardly by the spring 23. Movement of the latch 25 relative the link 34 is afforded by the pin and slot connection 35—36.

From the foregoing description, it will be apparent that I have provided an improved mechanism for manually actuating the carriage of a toaster, which mechanism includes a handle structure fixed to the carriage for actuating the carriage to its toasting position and a trip movable relative the handle for tripping the carriage latching mechanism when the operator desires to raise the carriage prior to the operation of the automatic timer. The manually-operated trip is disposed adjacent the handle where it may be readily engaged by the finger of the operator. The trigger of the tripping mechanism moves to an inactive position when the carriage is elevated and to an active position when the carriage is latched down. In the inactive position of the trigger, it may be housed in a recess in the handle where it is relatively inconspicuous. My improved handle and trip structure is positive in operation and the construction is such that it may be more readily and uniformly produced in quantity than prior-art structures of which I am aware.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a toaster having a casing defining a toasting oven, a bread carriage movable between upper and lower positions within said oven, means biasing the carriage to its upper position and a latch for retaining the carriage in its lower position, the combination of an arm fixed to the carriage and extending exteriorly of the casing, a handle carried by the arm for moving the carriage downwardly into latched position and a member pivoted to said arm for manually tripping said latch, said member having a tripping leg resting upon said latch in the lower position of the carriage and a trigger spaced below said handle, said member being movable by gravity about its pivot, the construction and arrangement being such that, in the upper position of the carriage, the tripping leg is out of engagement with the latch and said trigger is moved upwardly adjacent the handle.

2. In toasting apparatus including means defining a toasting oven, a bread carriage movable from an upper to a lower position within the oven, means biasing the carriage to its upper position and latching means for retaining the carriage in its lower position, the combination of a handle structure for moving the bread carriage to its lower position and including an arm secured to the bread carriage and a handle carried by the arm, said handle having a recess formed in the under side thereof, and a member pivoted to said arm and manually actuated at will for releasing the latching means, said member having a trigger portion movable within said recess and a tripping portion engageable with the latching means, the construction and arrangement being such that said trigger portion of the member is disposed at least in part within said recess so as to be concealed when the handle is in its upper position and is disposed out of said recess and below said handle when said handle is in its lower position so as to be accessible for tripping said latching means.

3. In a toaster having a casing defining a toasting oven, a bread carriage arranged in part within said oven and movable from an upper position to a lower position, means biasing the carriage to its upper position, a latch engageable with the carriage for retaining the latter in its lower position and means for actuating the latch to release the carriage at the conclusion of the toasting operation, the combination of a handle structure secured to the carriage for moving the same from its upper to its lower position, said handle structure extending outwardly of the casing and having a gripping portion fixed thereto exteriorly of the casing, said gripping portion having a recess formed in the under side thereof, and a member pivoted to said handle structure for actuating said latch independently of the latch actuating means, said member having a tripping leg engageable with said latch and a trigger arranged beneath the gripping portion of the handle structure, said member being movable by gravity about its pivot so that said trigger is disposed within the recess when the carriage is in its upper position and, when said tripping leg is in engagement with the latch, said trigger is disposed beneath and out of said recess.

BERNARD F. PARR.